(12) United States Patent
Kato et al.

(10) Patent No.: US 10,896,434 B2
(45) Date of Patent: Jan. 19, 2021

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventors: Takiko Kato, Tokyo (JP); Shigeru Kanda, Tokyo (JP)

(73) Assignee: Rakuten, Inc., Tokyo (JP)

( * ) Notice: Subject to any disclaimer, the term of this patent is extended or adjusted under 35 U.S.C. 154(b) by 295 days.

(21) Appl. No.: 15/527,405

(22) PCT Filed: Dec. 24, 2014

(86) PCT No.: PCT/JP2014/084156
§ 371 (c)(1),
(2) Date: May 17, 2017

(87) PCT Pub. No.: WO2016/103367
PCT Pub. Date: Jun. 30, 2016

(65) Prior Publication Data
US 2018/0033038 A1   Feb. 1, 2018

(51) Int. Cl.
*G06Q 30/02* (2012.01)
*G06Q 10/08* (2012.01)

(52) U.S. Cl.
CPC ..... *G06Q 30/0232* (2013.01); *G06Q 30/0222* (2013.01); *G06Q 10/083* (2013.01)

(58) Field of Classification Search
CPC .............. G06Q 30/02; G06Q 30/0232; G06Q 30/0222; G06Q 10/083
See application file for complete search history.

(56) References Cited

U.S. PATENT DOCUMENTS 9,367,856 B1 * 6/2016 Hattikudru ......... G06Q 30/0226
2003/0128391 A1 * 7/2003 Sato ....................... G06Q 30/02
358/1.18

(Continued)

FOREIGN PATENT DOCUMENTS

JP   2008-026935 A   2/2008

OTHER PUBLICATIONS

Buchinger et al., "Virtual currency for online platforms: Business model implications" (published in 2013 International Conference on e-Business (ICE-B), pp. 1-11, Jul. 1, 2013) (Year: 2013).*

*Primary Examiner* — James M Detweiler
*Assistant Examiner* — Patrick Kim
(74) *Attorney, Agent, or Firm* — Sughrue Mion, PLLC

(57) ABSTRACT

For a scheduled purchase, a point count setter sets an upper point usage limit in accordance with an operation. Based on point management information, a discount payment controller controls payment for the scheduled purchase so that the payment is executed at a discount based on the upper point usage limit set. A limited-time point count notifier determines the number of limited-time points scheduled to be used based on the point management information and the upper point usage limit, and before the scheduled purchase is executed, notifies a user of the number of limited-time points scheduled to be used. For a scheduled purchase in a series purchase, a revision suggestion notifier obtains the number of the user's points, and based on how the difference between the obtained number and the upper point usage limit occurs, gives the user a notice to suggest revising the upper point usage limit.

7 Claims, 14 Drawing Sheets

(56) References Cited

U.S. PATENT DOCUMENTS

| | | | | |
|---|---|---|---|---|
| 2004/0122734 A1* | 6/2004 | Schleicher | ............. | G06Q 30/02 |
| | | | | 705/14.27 |
| 2008/0162315 A1* | 7/2008 | Rampell | ............ | G06Q 30/0611 |
| | | | | 705/35 |
| 2013/0325578 A1* | 12/2013 | Ajram | ................ | G06Q 30/0222 |
| | | | | 705/14.28 |
| 2014/0379361 A1* | 12/2014 | Mahadkar | ............. | G06F 19/328 |
| | | | | 705/2 |

* cited by examiner

FIG. 2

| UID | PASSWORD | NAME | ADDRESS | E-MAIL ADDRESS | CREDIT CARD INFORMATION | |
|---|---|---|---|---|---|---|
| U0001 | ○△×○ | ××△○ | 〒000-0000 ... | ×××@<br>○×□.ne.jP | CARD NUMBER | C0001 |
| | | | | | HOLDER NAME | ××△○ |
| | | | | | EXPIRATION DATE | 201804 |
| ⋮ | ⋮ | ⋮ | ⋮ | ⋮ | ⋮ | |
| U××× | □△×× | □×○△ | 〒000-0000 ... | △××@<br>○○△.com | CARD NUMBER | C×××× |
| | | | | | HOLDER NAME | △××○ |
| | | | | | EXPIRATION DATE | 202005 |

FIG. 3A

| UID | EARNING DATE | EFFECTIVE DATE | EXPIRATION DATE | NUMBER OF POINTS |
|---|---|---|---|---|
| U O O O 1 | 20140811 | 20140908 | | 500 |
| | 20140811 | 20140908 | 20140922 | 150 |
| | 20140808 | 20140908 | | 320 |
| | . | . | . | . |
| | . | . | . | . |
| | . | . | . | . |
| | 2140107 | 2140210 | 2140220 | 14 |
| | . | . | . | . |
| | . | . | . | . |
| | . | . | . | . |
| U X X X | 20140725 | 20140901 | | 660 |
| | 20140725 | 20140901 | 20140915 | 30 |
| | . | . | . | . |
| | . | . | . | . |
| | . | . | . | . |
| | 20140321 | 20140401 | 20140415 | 20 |

FIG. 3B

| UID | USAGE DATE | NUMBER OF POINTS |
|---|---|---|
| U O O O 1 | 20140811 | ALL |
| | 20140705 | 500 |
| | . | . |
| | . | . |
| | . | . |
| | 2140110 | ALL |
| | . | . |
| | . | . |
| | . | . |
| U X X X | 20140725 | ALL |
| | 20140610 | 300 |
| | . | . |
| | . | . |
| | . | . |
| | 20140130 | 500 |

FIG. 6

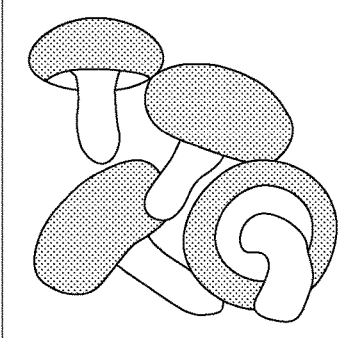

【SUBSCRIPTION】【FRESH SHIITAKE MUSHROOM】
800g 【FREE SHIPPING】
ITEM CODE: CTK-48
PRICE

¥2,500 (¥2,700 INCLUDING TAX)
INCLUDING SHIPPING FEE

SUBSCRIPTION

| SUBSCRIPTION PRICE | |
|---|---|
| DELIVERY | UNIT PRICE |
| PER DELIVERY | ¥2,500 (¥2,700 INCLUDING TAX) |

QUANTITY  1   SUBSCRIBE

INQUIRY ABOUT ITEM

☐INGREDIENTS
FRESH SHIITAKE MUSHROOM (DOMESTIC)
☐QUANTITY
800g
☐EXPIRATION DATE
REFRIGERATED: 10 DAYS
FROZEN      : 60 DAYS
☐STORAGE INFORMATION
REFRIGERATED: AT  10°C OR BELOW
FROZEN      : AT -18°C OR BELOW
☐PROCESSOR
C-TAKE HONPO INC.
☐☐☐△△△○○ OAZA,
YAMANAKA-CHO, KETAI-SHI, NAGANO

FIG. 7

YOUR ORDER IS AS FOLLOWS

| ITEM NAME | UNIT PRICE INCLUDING TAX | QUANTITY PER DELIVERY | SUBTOTAL INCLUDING TAX | SHIPPING FEE INCLUDING TAX | COD FEE INCLUDING TAX |
|---|---|---|---|---|---|
| [SUBSCRIPTION] [FRESH SHIITAKE MUSHROOM] 800 g [FREE SHIPPING] (CTK-48) | ¥2,500 | 1 | ¥2,700 | INCLUDED | EXCLUDED |
| | | | PRICE INCLUDING TAX | | |
| | PAYMENT AMOUNT PER DELIVERY | | ¥2,700 | | |

SELECT DELIVERY DATE AND CYCLE

SELECT DELIVERY DATE AND CYCLE

INFORMATION FROM SHOP ON DELIVERY DATE AND CYCLE

YOU CAN SPECIFY A DELIVERY DATE AND A CYCLE.
IF THERE IS ANY DIFFICULTY IN DELIVERY ON THE DATE YOU HAVE SPECIFIED,
WE WILL LET YOU KNOW IN ADVANCE.

DELIVERY DATE AND CYCLE?

FOR DETAILS ABOUT THE DELIVERY CYCLE, SEE HERE.

p6 — p5

| CYCLE | DELIVER EVERY ▼— V  FROM ▼—V THE DELIVERY CYCLE IS SELECTABLE FROM 5 to 90 DAYS |
|---|---|

NEXT p7 a1

FIG. 8

SELECT PAYMENT METHOD, SHIPPING METHOD, AND POINTS TO USE

SELECT PAYMENT METHOD AND SHIPPING METHOD

SELECT PAYMENT METHOD, SHIPPING METHOD. FOR INFORMATION ABOUT PAYMENT & SHIPPING METHOD, AND RETURN POLICY, SEE "EXPLANATION OF PAYMENT & SHIPPING METHODS" BY THE SHOP.

(1) PAYMENT METHOD    FOR DETAILS, SEE "EXPLANATION OF PAYMENT AND SHIPPING METHODS" BY THE SHOP

◉ CREDIT CARD                                ▼ USE ANOTHER CARD ▽  [SELECT]

| CARD COMPANY | KDC |
|---|---|
| CARD NUMBER | XXXX-XXXX-XXXX-1234 |
| EXPIRATION DATE | 12/2018 |
| HOLDER NAME | SANNOSUKE XXXXXX |
| NUMBER OF PAYMENTS | SINGLE PAYMENT   EASY PAYMENT/REVOLVING REPAYMENT   FROM HERE |

※ YOUR CREDIT CREDIT NUMBER NEVER BECOMES KNOWN TO THE STORE
※ USE A CARD IN YOUR OWN NAME

○ BANK TRANSFER

○ CASH ON DELIVERY
UMIMO TRANSPORT   NOTES:
[COD FEE TABLE] NATIONWIDE FLAT FEE : ¥324
　CONSUMPTION TAX FOR COD FEE        THIS FEE INCLUDES CONSUMPTION TAX
　SPECIFIED COD COMPANY              COURIER SERVICE

— a2

(2) SHIPPING METHOD    FOR DETAILS, SEE "EXPLANATION OF PAYMENT AND SHIPPING METHODS" BY THE SHOP

◉ COURIER SERVICE
DELIVERY COMPANY   UMIMO TRANSPORT   NOTES  UMIMO TRANSPORT IS IN CHARGE OF DELIVERY

[SHIPPING FEE TABLE]

| | | HOKKAIDO | TOHOKU | KANTO & SHINETSU | CHUBU & HOKURIKU | KANSAI & SHIKOKU | KYUSYU & CHUGOKU | OKINAWA |
|---|---|---|---|---|---|---|---|---|
| DISTRICT DETAIL | | HOKKAIDO | AOMORI IWATE MIYAGI AKITA YAMAGATA HUKUSHIMA | IBARAKI TOCHIGI GUNMA SAITAMA CHIBA TOKYO KANAGAWA NIIGATA YAMANASHI NAGANO | TOYAMA ISHIKAWA HUKUI GIHU SHIZUOKA AICHI MIE | SHIGA KYOTO OSAKA HYOGO NARA WAKAYAMA TOKUSHIMA KAGAWA EHIME KOCHI | TOTTORI SHIMANE OKAYAMA HIROSHIMA YAMAGUCHI HUKUOKA SAGA NAGASAKI KUMAMOTO OITA MIYAZAKI KAGOSHIMA | OKINAWA |
| FEE | | ¥1400 | ¥1100 | ¥900 | ¥900 | ¥900 | ¥900 | ¥1200 |

— a3

(3) SETTING OF UPPER POINT USGAE LIMIT

UPPER POINT USAGE LIMIT PER PURCHASE  =  [      ] POINTS

— a4

[ NEXT ]

p8    p9

INFORMATION PROCESSING DEVICE, INFORMATION PROCESSING METHOD, PROGRAM, AND STORAGE MEDIUM

CROSS REFERENCE TO RELATED APPLICATIONS

This application is a National Stage of International Application No. PCT/JP2014/084156, filed on Dec. 24, 2014, the contents of all of which are incorporated herein by reference in their entirety.

TECHNICAL FIELD

The present invention relates to an information processing device used for electronic commerce such as online shopping, an information processing method therefor, a program for achieving the information processing device, and a storage medium storing the program. In particular, the invention relates to techniques for performing processes for points available at the time of a scheduled purchase that is a purchase scheduled to be executed a period of time after a purchase order.

CITATION LIST

Patent Literature

Patent Literature 1: JP 2008-026935 A

BACKGROUND ART

Purchase of items or services over communication networks, such as the Internet, what is called online shopping is widely in use as a form of electronic commerce.

In some cases, online shopping gives points based on the purchase price of items or services, and the points can be used for future purchase of items or services. That is, a discount based on the number of points can be received (e.g., see the above Patent Literature 1).

There are some forms of online purchase of items or services, such as a series purchase that includes a plurality of purchases of an item or a service in one set and a pre-purchase that is made to place a pre-order to purchase an item yet to be released. Examples of the series purchase include a plurality of purchases of daily consumables, such as toilet rolls and a hair wash (what is called a shampoo), which are executed at intervals determined based on a single order.

Examples of the pre-purchase include placing a pre-order to purchase a book, a music CD, or the like yet to be released.

SUMMARY OF INVENTION

Technical Problem

For example, in terms of improvement in service, it is preferable that points can be used also for online purchases (hereinafter, simply "scheduled purchases") each of which is scheduled to be executed a period of time after a purchase order, such as each purchase in the series purchase and the pre-purchase.

However, the time lag between a purchase order and execution of a scheduled purchase is usually relatively large, during which the number of a user's points is highly likely to change. Thus, even if the user is prompted to enter the number of points to be used when placing a purchase order, the number of the user's points may possibly be less than the entered number of the points when the scheduled purchase is executed. In that case, the user cannot receive an intended discount on payment.

To solve this problem, if the number of the user's points has changed between the purchase order and the execution of the scheduled purchase, it might be possible that the user is prompted to enter a revised number of points to be used, but places a burden on the user.

For this reason, it is an object of the present invention to overcome the above problem, to enable a user to receive a discount on a scheduled purchase by the user's intended number of points, and to reduce the burden on the user.

Solution to Problem

An information processing device according to the present invention is an information processing device capable of accessing point management information. The point management information separately manages, as points available for purchasing an item or a service, limited-time points having expiration dates and normal points having no expiration date or a longer expiration date than the limited-time points. The information processing device includes a point count setter, a discount payment controller, a limited-time point count notifier, and a revision suggestion notifier. For a scheduled purchase, the point count setter sets an upper point usage limit in accordance with an operation. The scheduled purchase is a purchase scheduled to be executed a period of time after a purchase order. The upper point usage limit is an upper limit of the number of points to be used. Based on the point management information, the discount payment controller controls payment for the scheduled purchase so that the payment is executed at a discount based on the upper point usage limit set by the point count setter. For the scheduled purchase for which the upper point usage limit is set, the limited-time point count notifier determines the number of limited-time points scheduled to be used or the number of limited-time points scheduled not to be used, based on the point management information and the upper point usage limit. The number of limited-time points scheduled to be used is the number of the limited-time points scheduled to be used for the scheduled purchase. The number of limited-time points scheduled not to be used is the number of the limited-time points scheduled not to be used for the scheduled purchase. Before the scheduled purchase is executed, the limited-time point count notifier notifies a user of the number of limited-time points scheduled to be used or the number of limited-time points scheduled not to be used. When, as the scheduled purchase, a scheduled purchase in a series purchase is executed, the revision suggestion notifier obtains the number of a user's points at the time of the scheduled purchase. The scheduled purchase includes a plurality of purchases of an item or a service in one set. Based on how the difference between the obtained number of the user's points and the upper point usage limit occurs, the revision suggestion notifier gives a user a notice to suggest revising the upper point usage limit.

The user's points are used based on the upper point usage limit. Thus, the user notices in advance that the number of points to be used for the scheduled purchase is kept within the upper point usage limit. It is only when placing an order that the user has to set the number of points to be used.

The notice of the number of limited-time points scheduled to be used or the number of limited-time points scheduled not to be used prevents a relatively heavy burden of calculating the number of limited-time points scheduled to be used or scheduled not to be used from falling on the user. In addition, the revision suggestion notice prevents the burden of monitoring how the user's points are used from falling on the user and enables the user to revise the upper point usage limit to an appropriate limit depending on how the user earns and uses points.

In the information processing device according to the above-described present invention, the limited-time point count notifier preferably determines whether there is another scheduled purchase to be executed before the scheduled purchase in question. If there is the other scheduled purchase, the limited-time point count notifier preferably determines the number of limited-time points scheduled to be used for the scheduled purchase in question or the number of limited-time points scheduled not to be used, based on the number of limited-time points scheduled to be used for the other scheduled purchase.

In connection with the notice of the number of limited-time points scheduled to be used or not to be used, a plurality of scheduled purchases are allowed to exist overlapping with each other.

In the information processing device according to the above-described present invention, the limited-time point count notifier makes a determination whether the number of limited-time points available at purchase time, which is the number of limited-time points available for the scheduled purchase in question, is greater than or equal to the price of the item or the service subject to the scheduled purchase and the upper point usage limit set for the scheduled purchase is greater than or equal to the price of the item or the service. If a positive result is obtained, the limited-time point count notifier preferably selects the price of the item or the service as the number of limited-time points scheduled to be used. The limited-time point count notifier makes a determination whether the upper point usage limit set for the scheduled purchase is less than the price of the item or the service and the number of limited-time points available at purchase time is greater than or equal to the upper point usage limit set for the scheduled purchase. If a positive result is obtained, the limited-time point count notifier preferably selects the upper point usage limit set for the scheduled purchase as the number of limited-time points scheduled to be used. If negative results are obtained in both of the determinations, the limited-time point count notifier preferably selects the number of limited-time points available at purchase time as the number of limited-time points scheduled to be used.

Thus, the number of separate cases that are required to determine the number of limited-time points to be used is minimized.

In the information processing device according to the above-described present invention, every time a scheduled purchase in the series purchase is executed, the revision suggestion notifier determines whether a difference between the number of the user's points and the upper point usage limit occurs, and preferably gives the notice based on the frequency of occurrence of the difference.

Thus, a revision suggestion is made appropriately based on the frequency of occurrence of the difference between the number of the user's points obtained with each purchase and the upper point usage limit.

In the information processing device according to the above-described present invention, the revision suggestion notifier preferably gives the notice, based on the magnitude of the difference between the obtained number of the user's points and the upper point usage limit.

Thus, a revision suggestion is made appropriately based on the magnitude of the difference between the number of the user's points obtained with each purchase and the upper point usage limit.

An information processing method according to the present invention is an information processing method for an information processing device capable of accessing point management information. The point management information separately manages, as points available for purchasing an item or a service, limited-time points having expiration dates and normal points having no expiration date or a longer expiration date than the limited-time points. The information processing method includes the following steps. For a scheduled purchase, an upper point usage limit is set in accordance with an operation. The scheduled purchase is a purchase scheduled to be executed a period of time after a purchase order. The upper point usage limit is an upper limit of the number of points to be used. Based on the point management information, payment for the scheduled purchase is controlled so as to be executed at a discount based on the set upper point usage limit. For the scheduled purchase for which the upper point usage limit is set, the number of limited-time points scheduled to be used or the number of limited-time points scheduled not to be used is determined based on the point management information and the upper point usage limit. The number of limited-time points scheduled to be used is the number of the limited-time points scheduled to be used for the scheduled purchase. The number of limited-time points scheduled not to be used is the number of the limited-time points scheduled not to be used for the scheduled purchase. Before the scheduled purchase is executed, a user is notified of the number of limited-time points scheduled to be used or the number of limited-time points scheduled not to be used. When, as the scheduled purchase, a scheduled purchase in a series purchase is executed, the number of a user's points at the time of the scheduled purchase is obtained. The series purchase includes a plurality of purchases of an item or a service in one set. Based on how the difference between the obtained number of the user's points and the upper point usage limit occurs, a notice to suggest revising the upper point usage limit is given to a user.

Such an information processing method also achieves the same effect as the above-described information processing device according to the present invention.

A program according to the present invention is a program for causing an information processing device to perform a process that is performed as the above information processing method.

A storage medium according to the present invention is a storage medium storing the above program. These program and storage medium achieve the above information processing device.

Advantageous Effects of Invention

According to the present invention, a user can receive a discount on a scheduled purchase by the user's intended number of points, and the burden on the user is reduced.

BRIEF DESCRIPTION OF DRAWINGS

FIG. 2 is a diagram illustrating information stored in a user database;

FIGS. 3A and 3B are each a diagram illustrating information stored in a point database;

FIG. 6 is a diagram an example item page for an item that is subject to a series purchase (subscription);

FIG. 7 is a diagram showing an example of an item delivery cycle setting page;

FIG. 8 is a diagram showing an example of a payment method et cetera selection page;

DESCRIPTION OF EMBODIMENTS

Figure 1:
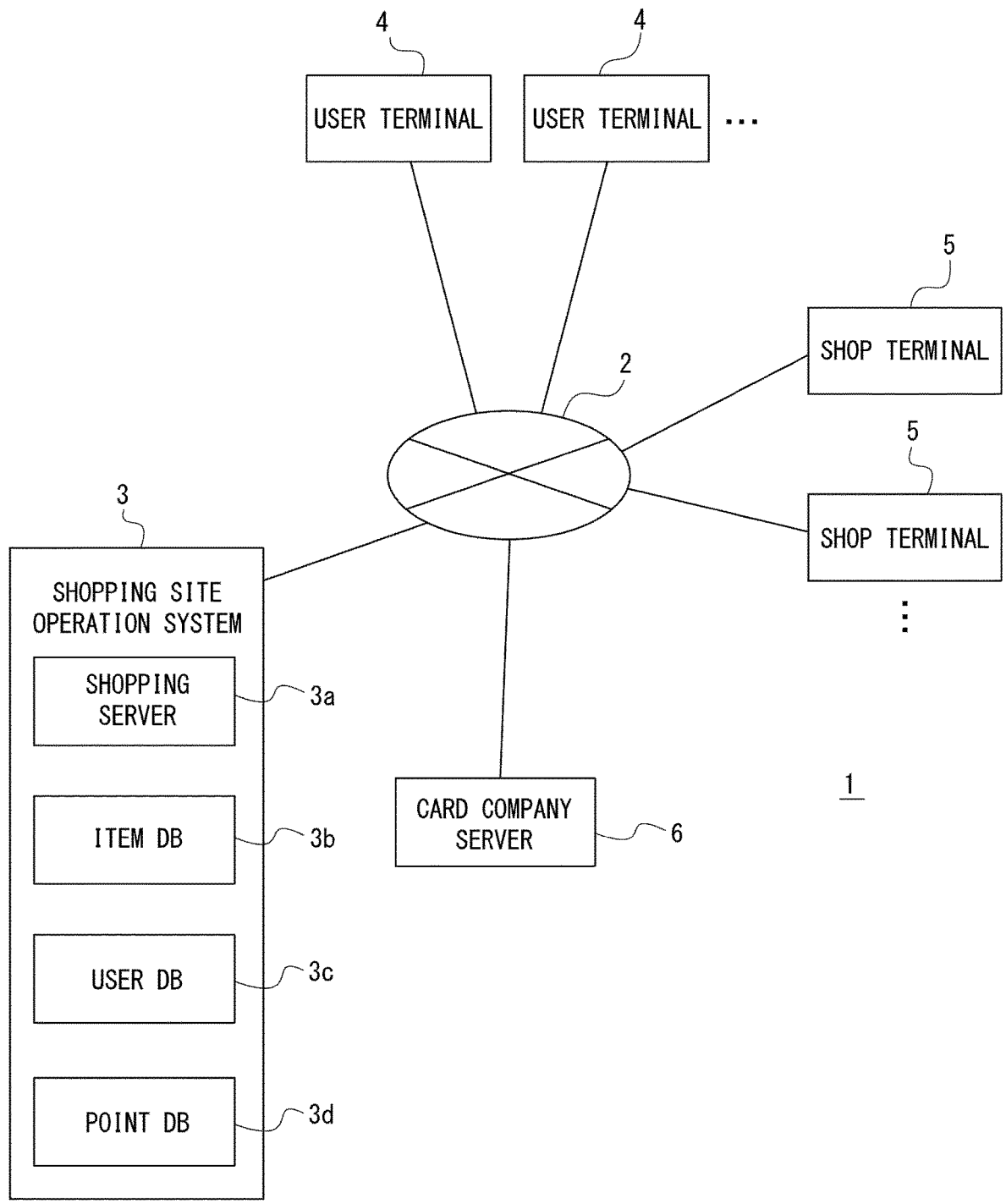
FIG. 1 is a diagram showing an example of a network system according to an embodiment.

The following describes an embodiment in the order listed below.
1. Overview of Network System
2. Hardware Configuration of Computer Device
3. Point-Related Process for Scheduled Purchase
4. Procedures
5. Summary of Embodiment
6. Program and Storage Medium
7. Modification 1. Overview of Network System FIG. 1 shows an example of a network system 1 assumed in this embodiment. The network system 1 operates as an electronic commerce (EC) system.

The network system 1 includes a shopping site operation system 3, a plurality of user terminals 4, a plurality of shop terminals 5, and a card company server 6 so that they can communicate with each other over a network 2, such as the Internet.

Each of the user terminals 4 is a computer device having a web browser. Examples of the user terminal 4 include a smart mobile phone (smartphone), a mobile phone, a personal digital assistant (PDA), and a mobile or desktop personal computer (PC), but the type of the user terminal 4 is not limited to these examples.

The user terminal 4 requests a web page or a predetermined process by sending a hypertext transfer protocol (HTTP) request, for example, to a shopping server 3a in the shopping site operation system 3 and a card company server 6 in a card company system. The user terminal 4 receives a web page sent in response to the HTTP request and displays it on the web browser. Thus, a user can view and operate a desired web page.

The shopping site operation system 3 includes the shopping server 3a, an item database (DB) 3b, a user DB 3c, and a point DB 3d, each of which is constituted by a computer device. These devices can communicate with each other via a network, such as a local area network (LAN).

The shopping server 3a performs various processes, based on the HTTP request sent from the user terminal 4. For example, the shopping server 3a generates and sends various web pages (e.g., an item web page, a shopping cart web page, and an order web page) and performs a purchase process in response to an order placement operation by a user.

In the network system 1, the shopping server 3a provides a website of a virtual mall (EC site: shopping site) to a user (user of the user terminal 4). There are a plurality of shops (member shops of the virtual mall) in the EC site. When a staff member of each shop registers items handled by the shop via a computer device as the shop terminal 5, various items handled by various shops are uploaded to the EC site. The user can access the EC site and purchase desired items using the user terminal 4.

In this example, transaction objects in the network system 1 are items. However, the transaction objects may be services.

In the shopping site operation system 3, the item DB 3b stores information about items registered via the shop terminals 5. Specifically, in association with an item ID for identifying each item, the item DB 3b stores an item name, an item genre, item image(s), a specification, item information including a summary of an introduction to the item, advertisement information, and other information. The item DB 3b also stores, for example, files of item web pages written in a markup language, such as hypertext markup language (HTML) or extensible markup language (XML).

This item DB 3b allows for, for example, searching for items based on entered keyword(s).

To shop on the EC site, users can sign up for the shopping site operation system 3. When signing up for the system, each user registers required information, such as a user ID (user identification information), a password, a name, an e-mail address, information about where items are to be delivered (address information), and a credit card number. A login to the EC site using the registered user ID saves the user from having to reenter the required information when purchasing items on the EC site.

As described above, the user DB 3c stores user information registered by each user as a member.

FIG. 2 is a diagram illustrating information stored in the user DB 3c.

As shown in the diagram, the user DB 3c stores, in association with each user ID, information about a password, a name, an e-mail address, and an address, and credit card information. As the credit card information, information about a card number, a holder (cardholder's name), and an expiration date is stored.

When a user performs a predetermined action, such as an item purchase, on the EC site, points are given to the user. The points here mean points that can be used at the time of purchase. The user can receive a discount on the purchase price, based on the number of points to use.

There are two types of points: normal points and limited-time points. Limited-time points have their expiration dates. Normal points have no expiration date or a longer expiration date than limited-time points. In this example, assume that normal points have no expiration date.

In the shopping site operation system 3, information about each user's points including these normal points and limited-time points is managed by the point DB 3d.

FIGS. 3A and 3B are each a diagram illustrating information stored in the point DB 3d. FIG. 3A illustrates each user's point earning history information. FIG. 3B illustrates each user's point usage history information.

In the earning history information shown in FIG. 3A, as various information about each set of points that the user identified by each user ID has earned, the earning date, the effective date, the expiration date, and the number of earned points are associated with the user ID. The effective date indicates when the earned points are scheduled to be available.

By referring to this earning history information, whether the earned points are normal points or limited-time points can be identified based on the expiration date.

In the usage history information shown in FIG. 3B, as various information about each set of points that the user identified by each user ID has used, the usage date and information about the number of used points are associated with the user ID.

Based on the earning history information and the usage history information stored in the point DB 3*d*, the shopping server 3*a* can calculate the number of each user's points.

In this example, the shopping server 3*a* updates the earning history information and the usage history information stored in the point DB 3*d* every time some points are earned or used.

When some points are used, the shopping server 3*a* performs this updating step so that limited-time points are used in preference to normal points. Specifically, if a user's points include both normal points and limited-time points when as many points as the user set are used in a purchase transaction, the limited-time points are preferentially used. If the user's limited-time points have different expiration dates, limited-time points that have shorter expiration dates (i.e., expire earlier than the others) are preferentially used in this transaction.

Here, the shopping server 3*a* in this example performs a process for a scheduled purchase based on an order from a user. A scheduled purchase is a purchase that is scheduled to be executed a period of time after a purchase order.

A scheduled purchase to be executed in this example is either each purchase in a series purchase that includes a plurality of item purchases in one set, or a pre-purchase that is scheduled to be executed based on a reservation that a user makes to purchase an item yet to be released. As also described above, examples of the series purchase include a plurality of purchases (what is called a subscription) of daily consumables, such as toilet rolls and a hair wash (what is called a shampoo), which are executed at intervals determined based on a single order. Examples of items that are subject to the pre-purchase include books and music CDs.

When a user places a series purchase order, the shopping server 3*a* performs a purchase process for an item ordered at intervals determined based on the order. When a user places a pre-purchase order, the shopping server 3*a* performs a purchase process for an item ordered at a predetermined timing corresponding to the arrival of the item ordered.

In the purchase process, the shopping server 3*a* calculates the purchase price (payment amount) of the item ordered, based on the price of the item ordered and information about the number of points to be used that was set by the user, and also performs a control process so that payment (card payment) of the purchase price is executed. Specifically, in this example, order information based on the calculated purchase price (including information such as the purchase price and a credit card number of the purchaser user) is sent to the shop terminal 5 of the shop that sold the items ordered.

The shop terminal 5, which has received the order information, requests the card company server 6 to process the payment by sending the order information to the card company server 6.

As for the above series purchase and pre-purchase, the shopping server 3*a* also performs a process for receiving the number of points to be used that is set by the user, a process for notifying the number of limited-time points scheduled to be used, and a process for a notice to suggest revising the set number of points to be used. These processes in this embodiment will be described later.

The card company server 6 manages card information and performs processes for authorization requests, settlement requests, and the like in which card numbers are specified.

Specifically, when receiving the above order information from the shop terminal 5, the card company server 6 performs authorization based on the card number included in the order information. If the authorization request is approved, the card company server 6 sends authorization approval notification including an authorization approval code to the shop terminal 5 and also sends quick report information (e.g., the usage date and the usage amount) about sales charged to the credit card number to the user's e-mail address.

The shop terminal 5 sends a settlement request based on the credit card number and the authorization approval code to the card company server 6 at a predetermined settlement request timing.

Based on the settlement request, the card company server 6 registers the payment amount associated with the corresponding authorization approval code as sales charged to the corresponding card number. Through such a sales registration, a process for withdrawing the payment amount from the account associated with the card number is performed at a subsequent predetermined timing.

In FIG. 1, there can be various example configurations of the network 2. The examples can include not only the Internet but also an intranet, an extranet, a local area network (LAN), a community antenna television (CATV) network, a virtual private network, a telephone network, a mobile communication network, and a satellite communication network.

There can also be various examples of a transmission medium constituting all or part of the network 2. The examples can include not only wires such as an Institute of Electrical and Electronics Engineers (IEEE) 1394, a universal serial bus (USB), a power-line communication, and a telephone line; but also wireless such as infrared light like infrared data association (IrDA), Bluetooth (registered trademark), 802.11 wireless, a mobile telephone network, a satellite channel, and a digital terrestrial network.

2. Hardware Configuration of Computer Device

Figure 4:
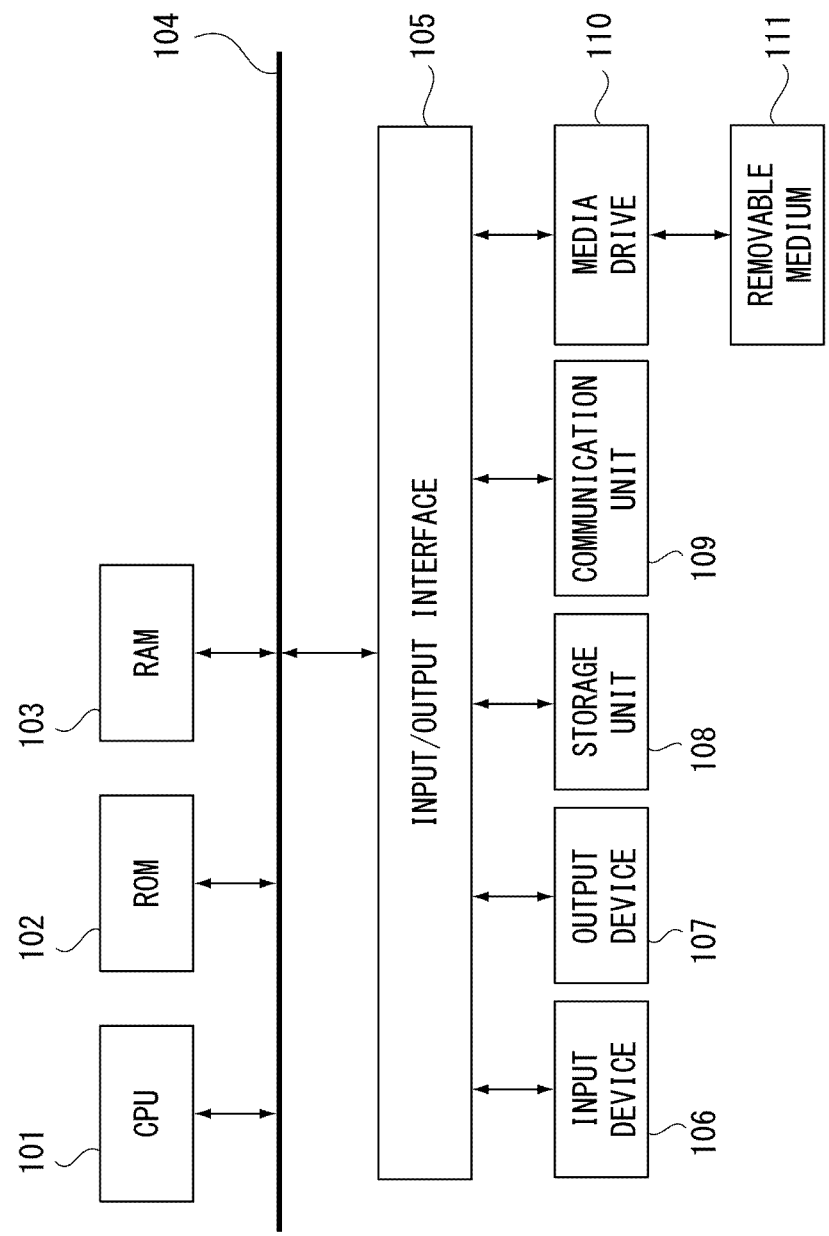
FIG. 4 is a block diagram showing a hardware configuration of each computer device constituting the network system according to the embodiment.

FIG. 4 shows a hardware configuration of a computer device constituting each of the devices shown in FIG. 1, such as the shopping server 3*a*, the item DB 3*b*, the user DB 3*c*, the point DB 3*d*, the user terminals 4, the shop terminals 5, and the card company server 6.

In FIG. 4, a central processing unit (CPU) 101 of the computer device performs various processes in accordance with programs stored in a read only memory (ROM) 102 or programs loaded from a storage unit 108 to a random access memory (RAM) 103. The RAM 103 also stores data required for the CPU 101 to perform the various processes and other data as appropriate.

The CPU 101, the ROM 102, and the RAM 103 are connected to each other via a bus 104. An input/output interface 105 is also connected to this bus 104.

An input device 106, an output device 107, the storage unit 108, and a communication unit 109 are connected to the input/output interface 105. The input device 106 includes, for example, a keyboard, a mouse, and a touch screen. The output device 107 includes, for example, a speaker and a display (display device), such as a liquid crystal display (LCD), a cathode ray tube (CRT), or an organic electroluminescent (EL) panel. The storage unit 108 includes, for example, a hard disk drive (HDD) and a flash memory device. The communication unit 109 performs intercommunication with external devices.

A media drive 110 is also connected to the input/output interface 105 as needed. A removable medium 111, such as a magnetic disk, an optical disk, a magneto-optical disk, or a semiconductor memory, is mounted on the media drive 110 as appropriate, and then information is written to and read from the removable medium 111.

Such a computer device can upload and download data and programs through communications by the communication unit 109, and can exchange data and programs via the removable medium 111.

The CPU 101, which performs processing operations in accordance with various programs, causes the computer device particularly as the shopping server 3a to perform communication and information processing which are described below.

3. Point-Related Process for Scheduled Purchase

As for a scheduled purchase that is scheduled to be executed a period of time after a purchase order, such as each purchase in the above-described series purchase or the pre-purchase, the time lag between the purchase order and execution of the scheduled purchase is relatively large, during which the number of a user's points is highly likely to change. Thus, even if the user is prompted to enter the number of points to be used when placing a purchase order, the number of the user's points may possibly be less than the entered number of the points when the scheduled purchase is executed. In that case, the user cannot receive an intended discount on payment.

For this reason, in this embodiment, for a scheduled purchase, a user is prompted not to set the number of points to be used itself but to set an "upper point usage limit" that is an upper limit of the number of points to be used.

Figure 5:
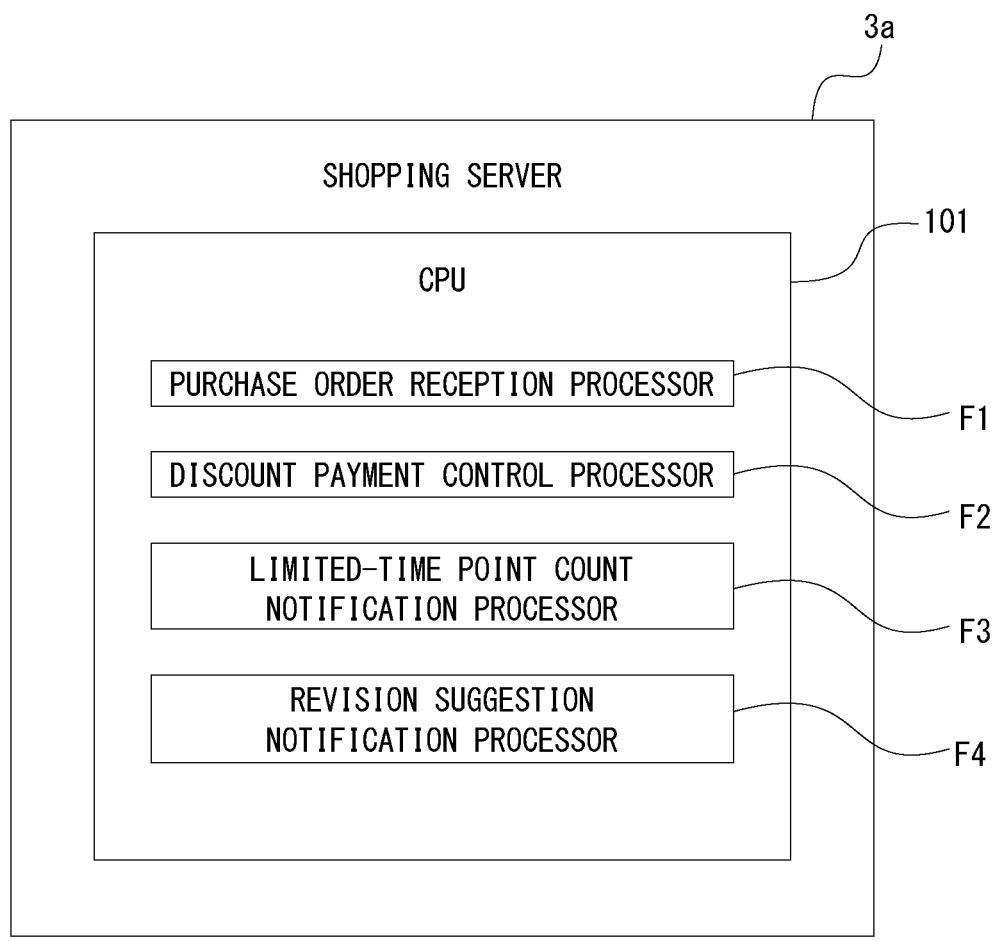
FIG. 5 is a functional block diagram showing functional blocks according to the embodiment.

FIG. 5 is a functional block diagram showing functional blocks of a point-related process for scheduled purchases, which includes a process for setting such an upper point usage limit, among the functions achieved by the CPU 101 of the shopping server 3a.

As shown in FIG. 5, the CPU 101 of the shopping server 3a includes, as the functional blocks, a purchase order reception processor F1, a discount payment control processor F2, a limited-time point count notification processor F3, and a revision suggestion notification processor F4.

The purchase order reception processor F1 performs a process for receiving scheduled purchase orders from users. Specifically, the purchase order reception processor F1 performs a process for receiving series purchase orders and pre-purchase orders.

With reference to FIGS. 6 to 8, an example flow from a series purchase order to completion of the purchase order is now described.

FIG. 6 shows an example item page for an item that is subject to a series purchase (subscription).

The item page presents an item image p1, an item name p2, and information about an item price p3, and also presents an order button p4 for placing a series purchase order, which is labeled character information, for example, "Subscribe".

In the case described here, the number of purchases included in the series purchase is fixed to a predetermined times (e.g., five times) which are not freely selected by any user, but of course, the number of purchase times may be freely selected.

FIG. 7 shows an example of an item delivery cycle setting page, which is presented in response to an operation (a mouse click or a touch operation) to select the order button p4.

The setting page presents a cycle selection area a1 for selecting an item delivery cycle and a Next button p7 for causing the purchase order step to proceed to the next step. In this example, the cycle selection area a1 includes a start date specification box p5 for specifying a cycle start date as the first item delivery date and an interval specification box p6 for specifying the interval between item delivery dates (the number of days in this example) after the start date.

When a user performs an operation to select the start date specification box p5, a pull-down list of candidate dates for the cycle start date is displayed in the start date specification box p5. The user can specify a desired candidate date as the cycle start date from the list. Similarly, when the user performs an operation to select the interval specification box p6, a pull-down list of candidate intervals (the range from 5 to 90 days in this example) is displayed. The user can specify a desired interval from the list. Through these specifying steps, the cycle for each purchase in the series purchase (the cycle for five purchases in this example) is selected.

After selecting a desired cycle from the cycle selection area a1, the user performs an operation to select the Next button p7.

FIG. 8 shows an example of a payment method et cetera selection page, which is presented in response to the operation to select the Next button p7.

The payment method et cetera selection page presents a payment method selection area a2 for selecting a payment method, for example, from among credit card, bank transfer, and cash on delivery; a shipping method selection area a3 for selecting a shipping method; an upper point usage limit specification area a4 for specifying an upper point usage limit; and a Next button p9 for causing the purchase order step to proceed to the next step.

The user respectively selects a desired payment method and a desired shipping method from the payment method selection area a2 and the shipping method selection area a3, and also specifies a desired upper point usage limit in the upper point usage limit specification area a4.

The upper point usage limit specification area a4 includes an input box p8 for entering the number of points. The user can specify an upper point usage limit by entering a numerical value in the input box p8.

After specifying a payment method, a shipping method, and an upper point usage limit, the user performs an operation to select the Next button p9.

Although not shown, an order details review page is presented in response to the operation to select the Next button p9. The review page presents an Accept button for accepting the details of the order. The user can place the series purchase order by performing an operation to select the Accept button.

When the order is thus placed, the setting of the item delivery cycle, the payment method, the shipping method, and the upper point usage limit, which were selected or specified by the user, has been completed.

Referring back to FIG. 5, the purchase order reception processor F1 sets the item delivery cycle, the payment method, the shipping method, and the upper point usage limit, based on the user's operations on the web pages shown in FIGS. 6 to 8.

Although the above describes a series purchase as an example, an upper point usage limit is set also when a pre-purchase order for a book, a CD, or the like is placed. Specifically, also when a pre-purchase order is placed, the upper point usage limit specification area a4 is presented on the payment method et cetera selection page, and an upper point usage limit is set based on a numerical value entered in the input box p8 included in the upper point usage limit specification area a4.

Subsequently, based on the information (point management information) stored in the point DB 3d, which manages normal points and limited-time points as described above, the discount payment control processor F2 controls payment for the scheduled purchase so that the payment is executed at a discount based on the upper point usage limit set by the above purchase order reception processor F1.

That is, based on the number of the user's points calculated from the above-described earning history information and usage history information, the discount payment control processor F2 controls payment for each purchase in the series purchase or the pre-purchase so that the payment is executed at a discount based on the set upper point usage limit.

Here, if "the number of the user's points" is greater than or equal to the "upper point usage limit", the discount payment control processor F2 controls the payment so that payment of the amount obtained by subtracting the upper point usage limit from the purchase price is made. In this example, the discount payment control processor F2 sends the order information to the corresponding shop terminal 5 as described above.

On the other hand, if "the number of the user's points" is less than the "upper point usage limit", the discount payment control processor F2 controls the payment so that payment of the amount obtained by subtracting the number of the user's points from the purchase price is made.

When the user's points are used, limited-time points are used in preference to normal points as described above. In addition, limited-time points having shorter expiration dates are preferentially used.

The limited-time point count notification processor F3 determines the number of limited-time points scheduled to be used for the scheduled purchase, for which the upper point usage limit is set, based on the information stored in the point DB 3d and on the set upper point usage limit. Before the scheduled purchase is executed, the limited-time point count notification processor F3 notifies the number of limited-time points scheduled to be used to the user.

To efficiently use limited-time points before the expiration dates, which are set relatively short, users have to continuously check their limited-time points earned one after another for expiration dates. Such continuous checks can be a relatively heavy burden on the users.

There are also some cases where some users may rush to use their limited-time points that expire soon not to waste the points (by almost forcing themselves to look for items to purchase).

For this reason, in this embodiment, the limited-time point count notification processor F3 determines the number of limited-time points scheduled to be used for the scheduled purchase and gives the user an advance notice of the number of limited-time points scheduled to be used. This advance notice reduces the user's burden of checking his or her limited-time points for expiration dates. When some limited-time points are to be used for the scheduled purchase, the user notices in advance that there is no need to rush to use the points.

The notice of the number of limited-time points scheduled to be used is given to the user, for example, by an e-mail sent to the user's registered e-mail address.

The number of limited-time points scheduled to be used can be determined based on the number of limited-time points available at the time of execution of the scheduled purchase in question (hereinafter, referred to as "the number of limited-time points available at purchase time"), on the price of the item to be purchased, and on the set upper point usage limit.

There are the following two example methods for determining the number of limited-time points scheduled to be used, based on the number of limited-time points available at purchase time, the item price, and the upper point usage limit.

The first method is an example that is based on whether "the upper point usage limit is greater than or equal to the item price". Specifically, when the upper point usage limit is greater than or equal to the item price,
1) if the number of limited-time points available at purchase time is greater than or equal to the item price, the number of limited-time points scheduled to be used is set to the item price, and
2) if the number of limited-time points available at purchase time is less than the item price, the number of limited-time points scheduled to be used is set to the number of limited-time points available at purchase time.

When the upper point usage limit is less than the item price,
3) if the number of limited-time points available at purchase time is greater than or equal to the upper point usage limit, the number of limited-time points scheduled to be used is set to the upper point usage limit, and
4) if the number of limited-time points available at purchase time is less than the upper point usage limit, the number of limited-time points scheduled to be used is set to the number of limited-time points available at purchase time.

Thus, the number of limited-time points scheduled to be used for the scheduled purchase in question can be determined.

The second method is a method based on possible values for the number of limited-time points scheduled to be used.

The possible values for the number of limited-time points scheduled to be used include the item price, the upper point usage limit, and the number of limited-time points available at purchase time.

When the number of limited-time points available at purchase time is greater than or equal to the item price and the upper point usage limit is greater than or equal to the item price (condition I), the number of limited-time points scheduled to be used is set to the item price.

When the upper point usage limit is less than the item price and the number of limited-time points available at purchase time is greater than or equal to the upper point usage limit (condition II), the number of limited-time points scheduled to be used is set to the upper point usage limit.

When the number of limited-time points available at purchase time is less than the item price and the number of limited-time points available at purchase time is less than the upper point usage limit, that is, when neither the condition I nor II is satisfied, the number of limited-time points scheduled to be used is set to the number of limited-time points available at purchase time.

That is, whether the condition I or II is satisfied is determined. If the condition I is satisfied, the number of limited-time points scheduled to be used is set to the item price. If the condition II is satisfied, the number of limited-time points scheduled to be used is set to the upper point usage limit. If neither the condition I nor II is satisfied, the number of limited-time points scheduled to be used is set to the number of limited-time points available at purchase time.

The above second method handles a fewer number of separate cases that are required to determine the number of limited-time points scheduled to be used than the first method, and minimizes the number of the cases. Thus, the burden of separating cases that are required to determine the number of limited-time points scheduled to be used is reduced.

In this example, the second method is adopted.

In this example, when the number of limited-time points scheduled to be used for a first scheduled purchase is determined, it is also taken into consideration that there can be a second scheduled purchase to be executed between the time of execution of a process for determining the number of limited-time points scheduled to be used and the scheduled execution date of the first scheduled purchase. That is, when determining the number of limited-time points scheduled to be used for the scheduled purchase in question, the limited-time point count notification processor F3 determines whether there is another scheduled purchase to be executed before the scheduled purchase in question. If there is the other scheduled purchase, the limited-time point count notification processor F3 determines "the number of limited-time points available at purchase time" for the scheduled purchase in question, based on the number of limited-time points scheduled to be used for the other scheduled purchase, and then determines the number of limited-time points scheduled to be used for the scheduled purchase in question, based on "the number of limited-time points available at purchase time", the item price, and the upper point usage limit, by using the above method.

At this time, "the number of limited-time points available at purchase time" for the scheduled purchase in question is calculated at the value obtained by subtracting the number of limited-time points scheduled to be used for the other scheduled purchase from the limited-time points that expires after the scheduled execution date of the scheduled purchase in question, among the number of limited-time points that the user has at the current time (the time of processing).

A specific example of calculating such number of limited-time points scheduled to be used for the scheduled purchase in question as reflects the number of limited-time points scheduled to be used for the other scheduled purchase will be described later.

When a purchase in the series purchase is executed as the scheduled purchase, the revision suggestion notification processor F4 obtains the number of the user's points at the time of the purchase. Based on how the difference between the obtained number of the user's points and the upper point usage limit occurs, the revision suggestion notification processor F4 gives the user a notice to suggest revising the upper point usage limit.

If the number of the user's points at the time of execution of the scheduled purchase is different from the upper point usage limit set by the user for the scheduled purchase, the set upper point usage limit can be said to be so inappropriate that the limit does not match how the user earns and uses points. For this reason, based on how the difference occurs, the revision suggestion notification processor F4 suggests that the user revise the upper point usage limit.

In this example, the notice to suggest revising the upper point usage limit is given based on the frequency of occurrence of the difference between the number of the user's points and the upper point usage limit and on the magnitude of the difference. Specifically, every time a scheduled purchase is executed, the revision suggestion notification processor F4 calculates the difference between the number of the user's points and the upper point usage limit, determines whether the difference is greater than or equal to a predetermined value "Y" a predetermined number of scheduled purchases (X times) or more in a row, and then gives the notice to suggest revising the upper point usage limit if so.

In this case, the revision suggestion notice is given, for example, by sending an e-mail message like "Your upper point usage limit seems to be set low. Do you raise the upper point usage limit?" to the user's registered e-mail address. At this time, an appropriate number of raised points may be determined based on the previous X times of difference between the number of the user's points and the upper point usage limit, and information about the number of raised points may be included in the revision suggestion notice. History information about the number of the user's points and the number of points used for each purchase in the series purchase in question may also be included in the revision suggestion notice.

4. Procedures

The following describes specific procedures to be performed to achieve the functions as the embodiment described above, with reference to the flowcharts shown in FIGS. 9 to 14. The processes shown in these flowcharts are performed by the CPU 101 of the shopping server 3a in accordance with the programs stored in storage devices such as the storage unit 108.

Figure 9:
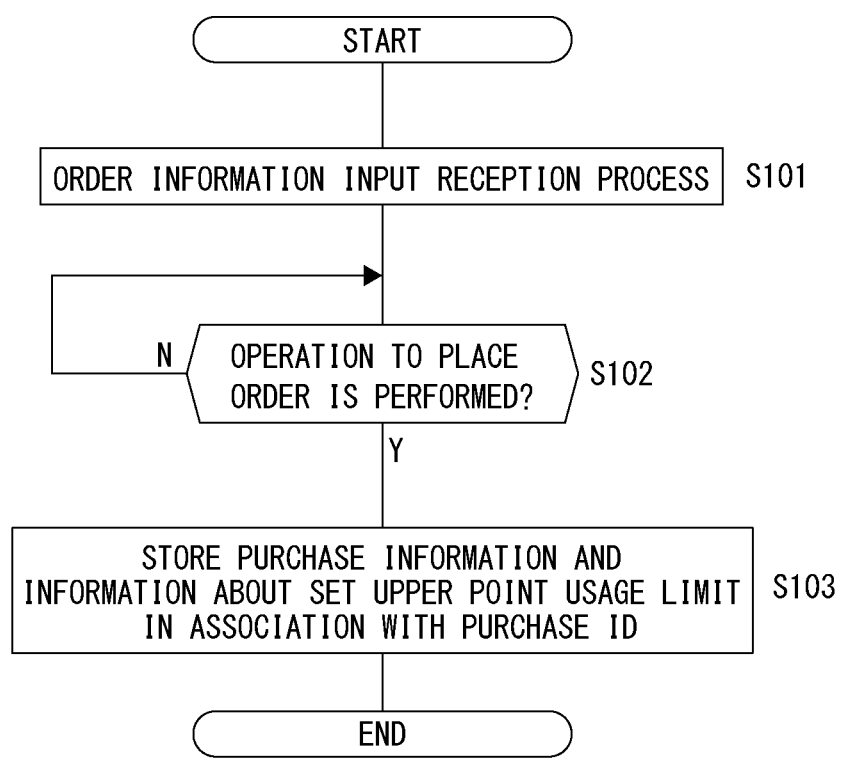
FIG. 9 is a flowchart showing a process corresponding to a purchase order reception processor.

FIG. 9 shows a process corresponding to the purchase order reception processor F1.

In FIG. 9, the CPU 101 of the shopping server 3a performs a process for receiving information about a scheduled purchase order input by a user as an order information input reception process of Step S101. Specifically, information entered by the user on the above web pages shown in FIGS. 6 to 8 is received. As can be understood from the above description, the information entered here includes information about an upper point usage limit entered in the input box p8 on the web page shown in FIG. 8.

In the following Step S102, the CPU 101 waits until an operation to place the order is performed. That is, the CPU 101 waits until an operation to select the Accept button on the above-described order details review page is detected.

When the operation to place the order is performed, the CPU 101 stores purchase information and information about the set upper point usage limit in association with a purchase ID in Step S103. The purchase information includes the item ID of a purchased item, the shop ID of the shop that sold the item, and information about the price of the item. For a series purchase, the purchase information further includes information about a cycle for each purchase. For a pre-purchase, the purchase information further includes information about the scheduled arrival date of the item (the scheduled execution date of the purchase).

The purchase ID is information for identifying a series purchase order or a pre-purchase order placed by the user and is generated by the CPU 101 of the shopping server 3a.

After the association of Step S103 is performed, the CPU 101 terminates the process shown in this figure.

Figure 10:
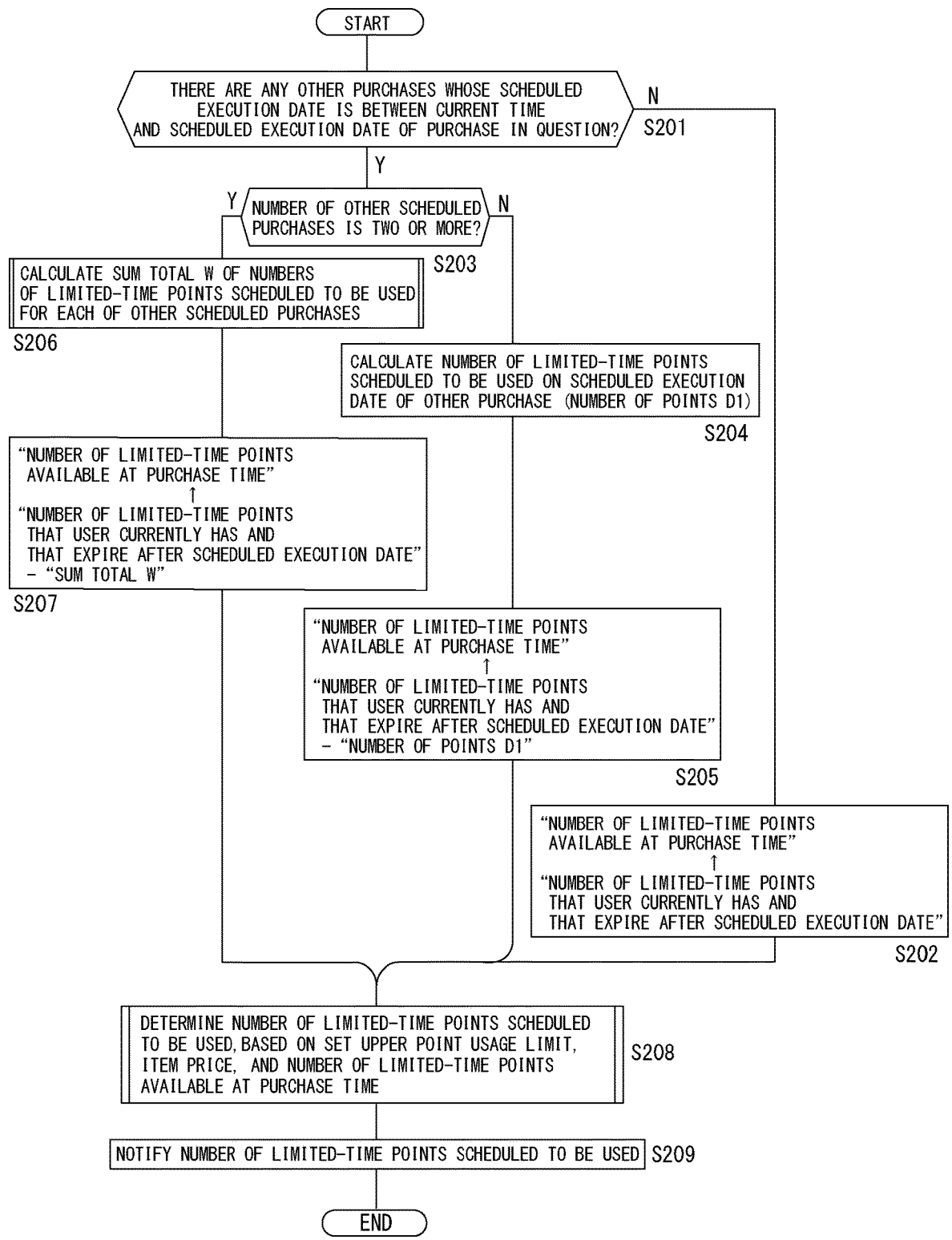
FIG. 10 is a flowchart showing a process corresponding to a limited-time point count notification processor.

FIG. 10 shows a process corresponding to the limited-time point count notification processor F3.

First, in Step S201, the CPU 101 determines whether there are any other scheduled purchases whose scheduled execution date is between the current time and the scheduled execution date of a scheduled purchase in question. If there are no such other scheduled purchases, the CPU 101 proceeds to Step S202. In Step S202, the CPU 101 sets "the number of limited-time points available at purchase time" to "the number of limited-time points that the user currently has and that expire after the scheduled execution date" (the number of limited-time points that expire after the scheduled execution date of the scheduled purchase in question, among the number of limited-time points that the user currently has). After that, the CPU 101 proceeds to Step S208.

On the other hand, if it is determined in Step S201 that there are some other scheduled purchases, the CPU 101 proceeds to Step S203. In Step S203, the CPU 101 determines whether the number of the other scheduled purchases is two or more.

If the number of the other scheduled purchases is one, the CPU 101 proceeds to Step S204. In Step S204, the CPU 101 calculates "the number of limited-time points scheduled to be used" for the other scheduled purchase (hereinafter, referred to as "the number of points d1").

Here, "the number of limited-time points scheduled to be used" for the other scheduled purchase is determined by performing the same process as is shown in FIG. 10 using the other scheduled purchase in place of "the scheduled purchase in question". The same applies to Steps S303 and S305 in FIG. 11 described later.

In the following Step S205, the CPU 101 sets "the number of limited-time points available at purchase time" to the value obtained by subtracting the above number of points d1 from "the number of limited-time points that the user currently has and that expire after the scheduled execution date". After that, the CPU 101 proceeds to Step S208.

On the other hand, if the number of the other scheduled purchases is two or more, the CPU 101 proceeds to Step S206. In Step S206, the CPU 101 calculates the sum total W of the numbers of limited-time points scheduled to be used for each of the other scheduled purchases.

Figure 11:
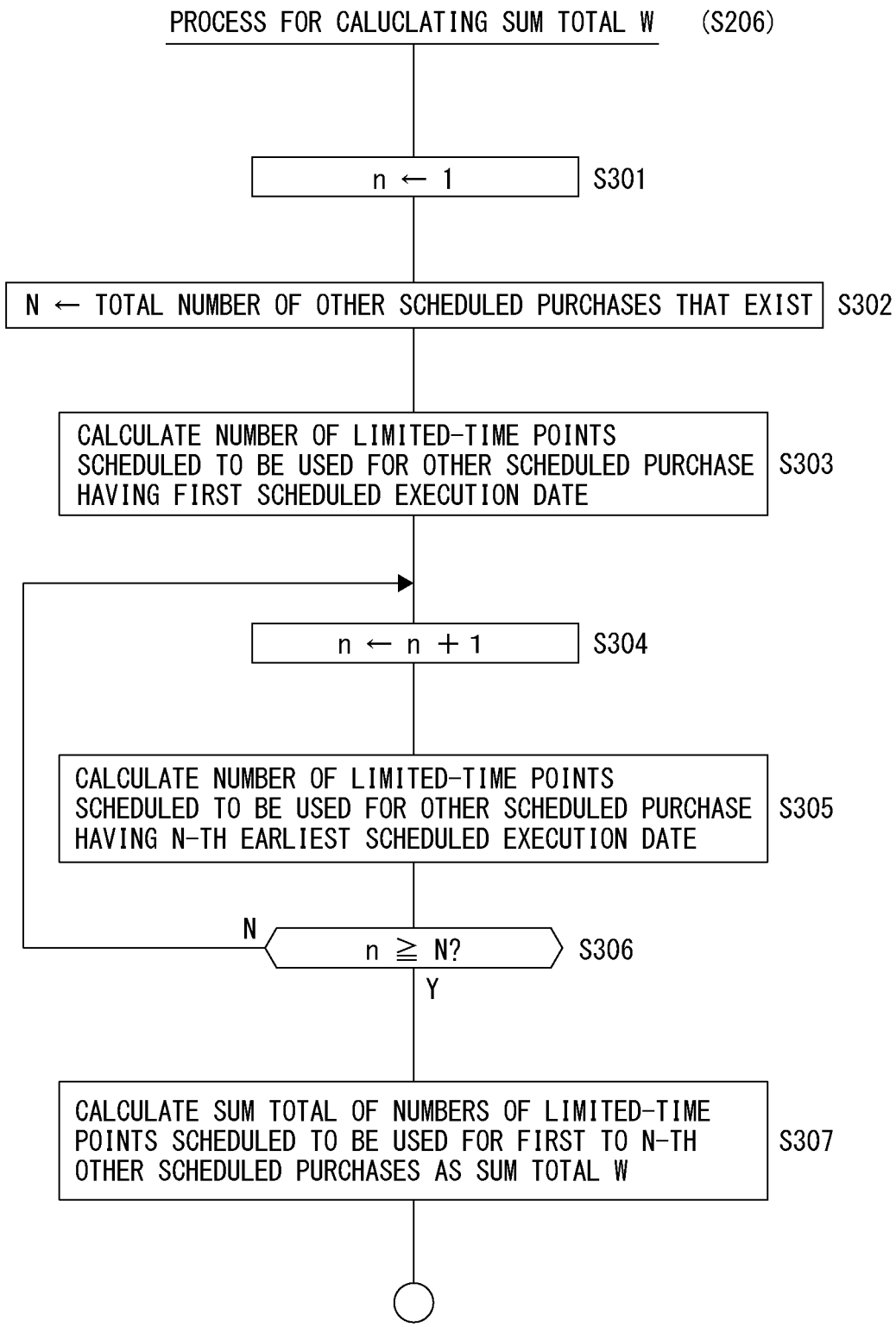
FIG. 11 is a flowchart showing a process for calculating the sum total of the numbers of limited-time points scheduled to be used for other scheduled purchases.

FIG. 11 shows a process for calculating the sum total W in Step S206.

In Step S301, the CPU 101 sets a count value n for identifying each of the other scheduled purchases to "1". In the following Step S302, the CPU 101 sets N to the total number of the other scheduled purchases that exist, and then proceeds to Step S303.

In Step S303, the CPU 101 calculates the number of limited-time points scheduled to be used for the other scheduled purchase that has the first (earliest) scheduled execution date.

In the following Step S304, the CPU 101 increments the count value n (by +1). In Step S305, the CPU 101 calculates the number of limited-time points scheduled to be used for the other scheduled purchase that has the n-th earliest scheduled execution date. In Step S306, the CPU 101 determines whether the count value n is greater than or equal to N, which is the total number of the other scheduled purchases.

If the count value n is not greater than or equal to the total number N, the CPU 101 returns to Step S304. That is, Steps S304 to S306 are repeated until the numbers of limited-time points scheduled to be used for all of the other scheduled purchases that exist are calculated.

If the count value n is greater than or equal to the total number N, the CPU 101 proceeds to Step S307. In Step S307, the CPU 101 calculates the sum total of the numbers of limited-time points scheduled to be used for the first to N-th other scheduled purchases as the sum total W, and then finishes the process for calculating the sum total W in Step S206.

Referring back to FIG. 10, in Step S207 following Step S206, the CPU 101 sets "the number of limited-time points available at purchase time" to the value obtained by subtracting the sum total W from "the number of limited-time points that the user currently has and that expire after the scheduled execution date". After that, the CPU 101 proceeds to Step S208.

In Step S208, the CPU 101 determines the number of limited-time points scheduled to be used for the scheduled purchase in question, based on the upper point usage limit set for the scheduled purchase in question, the item price, and "the number of limited-time points available at purchase time" set in Step S202, S205, or S207.

Figure 12:
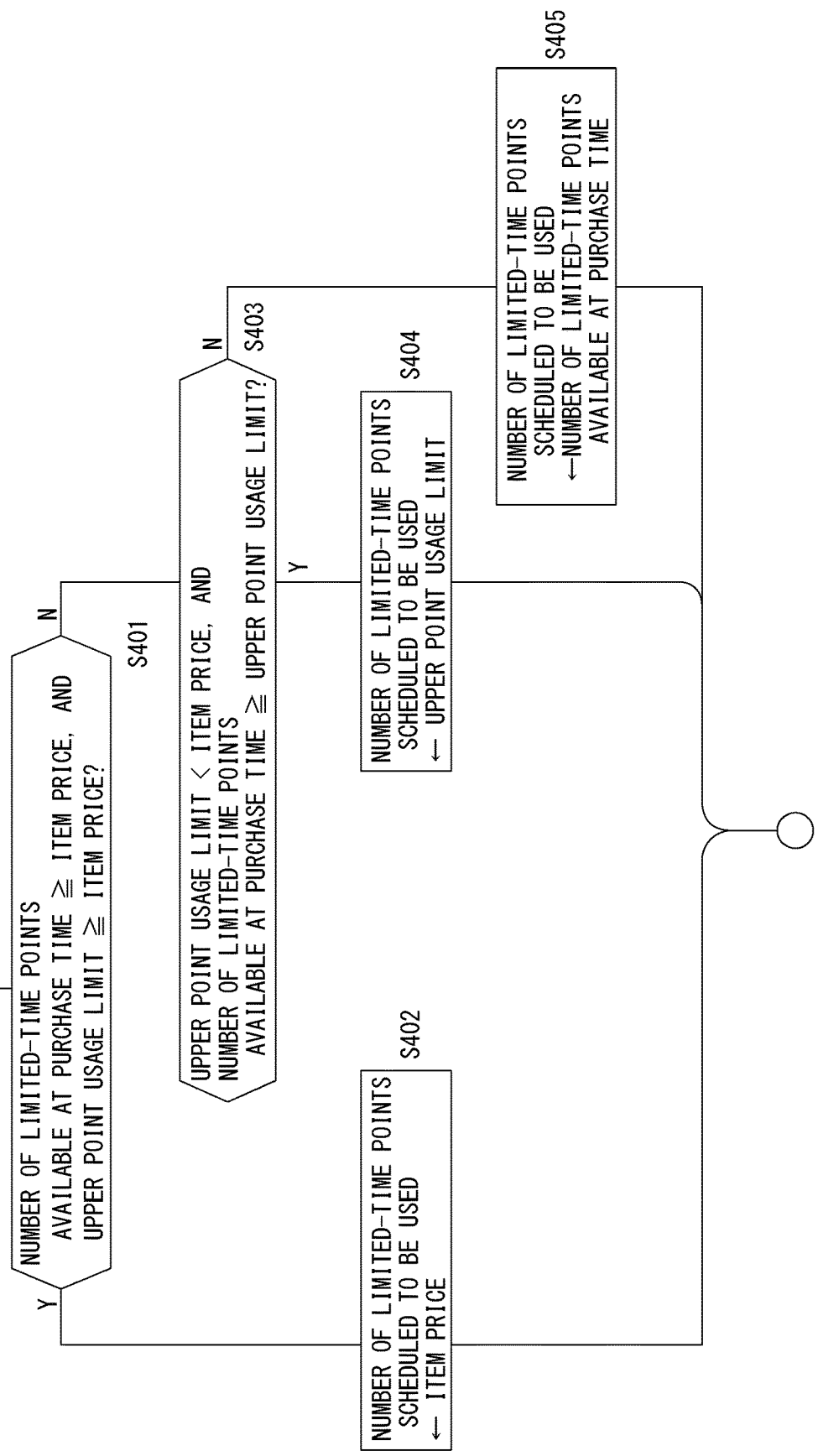
FIG. 12 is a flowchart showing a process for determining the number of limited-time points scheduled to be used for a scheduled purchase in question.

FIG. 12 shows a specific process performed in Step S208.

In this example, based on whether the above-described condition I is satisfied and on whether the condition II is satisfied, the number of limited-time points scheduled to be used is determined to be the item price, the upper point usage limit, or the number of limited-time points available at purchase time.

Specifically, in Step S401, the CPU 101 determines whether the number of limited-time points available at purchase time is greater than or equal to the item price and the upper point usage limit is greater than or equal to the item price (condition I). If a positive result is obtained, the CPU 101 proceeds to Step S402. In Step S402, the CPU 101 sets the number of limited-time points scheduled to be used to the item price, and then finishes Step S208.

On the other hand, if a negative result is obtained in the determination of Step S401, the CPU 101 proceeds to Step S403. In Step S403, the CPU 101 determines whether the upper point usage limit is less than the item price and the number of limited-time points available at purchase time is greater than or equal to the upper point usage limit (condition II). If a positive result is obtained, the CPU 101 proceeds to Step S404. In Step S404, the CPU 101 sets the number of limited-time points scheduled to be used to the upper point usage limit, and then finishes Step S208.

If a negative result is obtained in the determination of Step S403, that is, if neither the condition I nor II is satisfied, the CPU 101 proceeds to Step S405. In Step S405, the CPU 101 sets the number of limited-time points scheduled to be used to the number of limited-time points available at purchase time, and then finishes Step S208.

When the number of limited-time points scheduled to be used is determined in the above Step S208, the CPU 101 proceeds to Step S209 shown in FIG. 10. In Step S209, the CPU 101 performs a process for notifying the number of limited-time points scheduled to be used. That is, the CPU 101 performs a process for sending an e-mail including at least information about the number of limited-time points scheduled to be used to the user's registered e-mail address.

The notice here is not limited to an e-mail notice and may be provided, for example, on a predetermined web page of the EC site.

Although the above describes an example where the number of limited-time points that are scheduled to be used for the scheduled purchase is notified, the number of limited-time points that are scheduled not to be used for the scheduled purchase (hereinafter, referred to as "the number of limited-time points scheduled not to be used" may be notified in place of this or together with this. "The number of limited-time points scheduled not to be used" may be calculated, for example, by subtracting "the number of limited-time points scheduled to be used" determined by the above method from the number of points that the user has at the current time (the time of execution of the process shown in FIG. 10). Alternatively, particularly for a case where there are no other scheduled purchases, "the number of limited-time points scheduled not to be used" can also be determined to be the sum of the number of limited-time points that expire at or before the scheduled execution date of the scheduled purchase in question, among the number of points that the user has at the current time (the time of execution of the process shown in FIG. 10), and the number of limited-time points not to be used for the scheduled purchase in question, among "the number of limited-time points available at purchase time".

The above describes an example where the value of "the number of limited-time points scheduled to be used for the other scheduled purchase(s)" that is required to calculate "the number of limited-time points available at purchase time" for the scheduled purchase in question is calculated in Step S204 or S206 each time. However, if "the number of limited-time points scheduled to be used for the other scheduled purchase(s)" is already calculated and stored, the stored number of points can be used.

Figure 13:
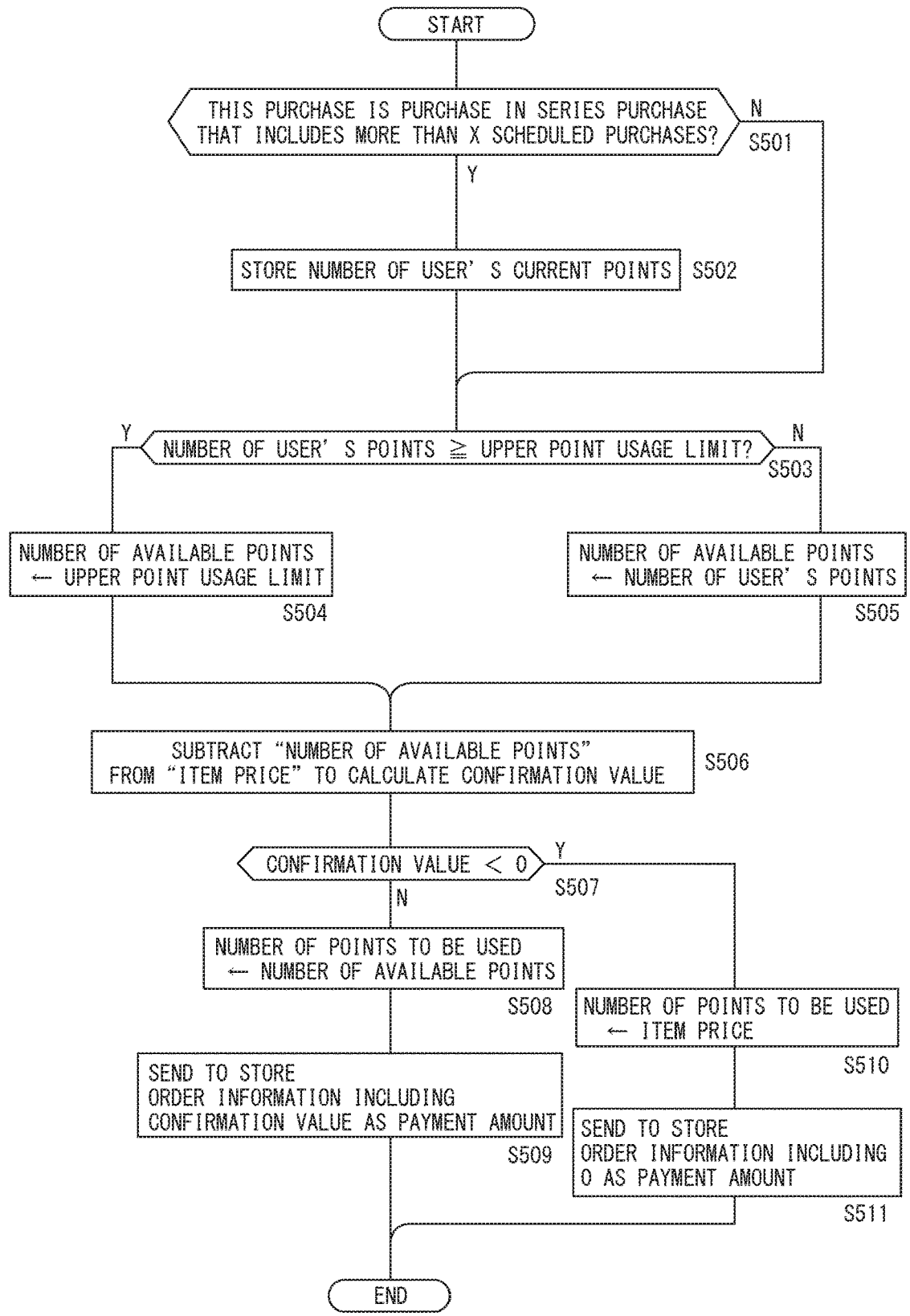
FIG. 13 is a flowchart showing a process corresponding to a discount payment control processor.

FIG. 13 shows a process corresponding to the discount payment control processor F2.

The process shown in FIG. 13 is started when a condition for executing a scheduled purchase as each purchase in a series purchase or a pre-purchase is satisfied.

First, in Step S501, the CPU 101 determines whether this scheduled purchase is a purchase in a series purchase that includes more than X scheduled purchases.

If the scheduled purchase is a purchase in a series purchase that includes more than X scheduled purchases, that is, a positive result is obtained, the CPU 101 proceeds to Step S502. In Step S502, the CPU 101 stores the number of the user's current points (the number of points that the user who ordered this scheduled purchase has), for example, in the storage unit 108, and then proceeds to Step S503.

The information stored in this Step S502 is information about the number of the user's points at the time of each purchase and is used to determine whether to give a revision suggestion notice for the series purchase (described later with reference to FIG. 14).

On the other hand, if a negative result is obtained in the determination of Step 501, that is, the scheduled purchase in question is a pre-purchase or a purchase in a series purchase that includes equal to or less than X scheduled purchases, the CPU 101 skips the storing of Step S502 and proceeds to Step S503.

In Step S503, the CPU 101 determines whether the number of the user's points is greater than or equal to the upper point usage limit. If the number of the user's points is greater than or equal to the upper point usage limit, the CPU 101 proceeds to S504. In Step S504, the CPU 101 sets "the number of available points" to the upper point usage limit, and then proceeds to S506.

On the other hand, if the number of the user's points is not greater than or equal to the upper point usage limit, the CPU 101 proceeds to S505. In Step S505, the CPU 101 sets "the number of available points" to the number of the user's points, and then proceeds to S506.

As can be understood from the following description, "the number of available points" is a candidate value for the number of points to be used for this purchase (hereinafter, referred to as "the number of points to be used").

In Step S506, the CPU 101 subtracts "the number of available points" from the "item price" to calculate a confirmation value. In the following Step S507, the CPU 101 determines whether the confirmation value is less than 0, that is, whether the number of available points is greater than the item price.

If the confirmation value is not less than 0, the CPU 101 proceeds to Step S508. In Step S508, the CPU 101 sets "the number of points to be used" to "the number of available points". In Step S509, the CPU 101 sends order information including the confirmation value as the payment amount to the corresponding shop terminal 5, and then finishes the process shown in this figure.

On the other hand, if the confirmation value is less than 0, the CPU 101 proceeds to Step S510. In Step S510, the CPU 101 sets "the number of points to be used" to the item price. In Step S511, the CPU 101 sends order information including a payment amount of 0 to the corresponding shop terminal 5, and then finishes the process shown in this figure.

Figure 14:
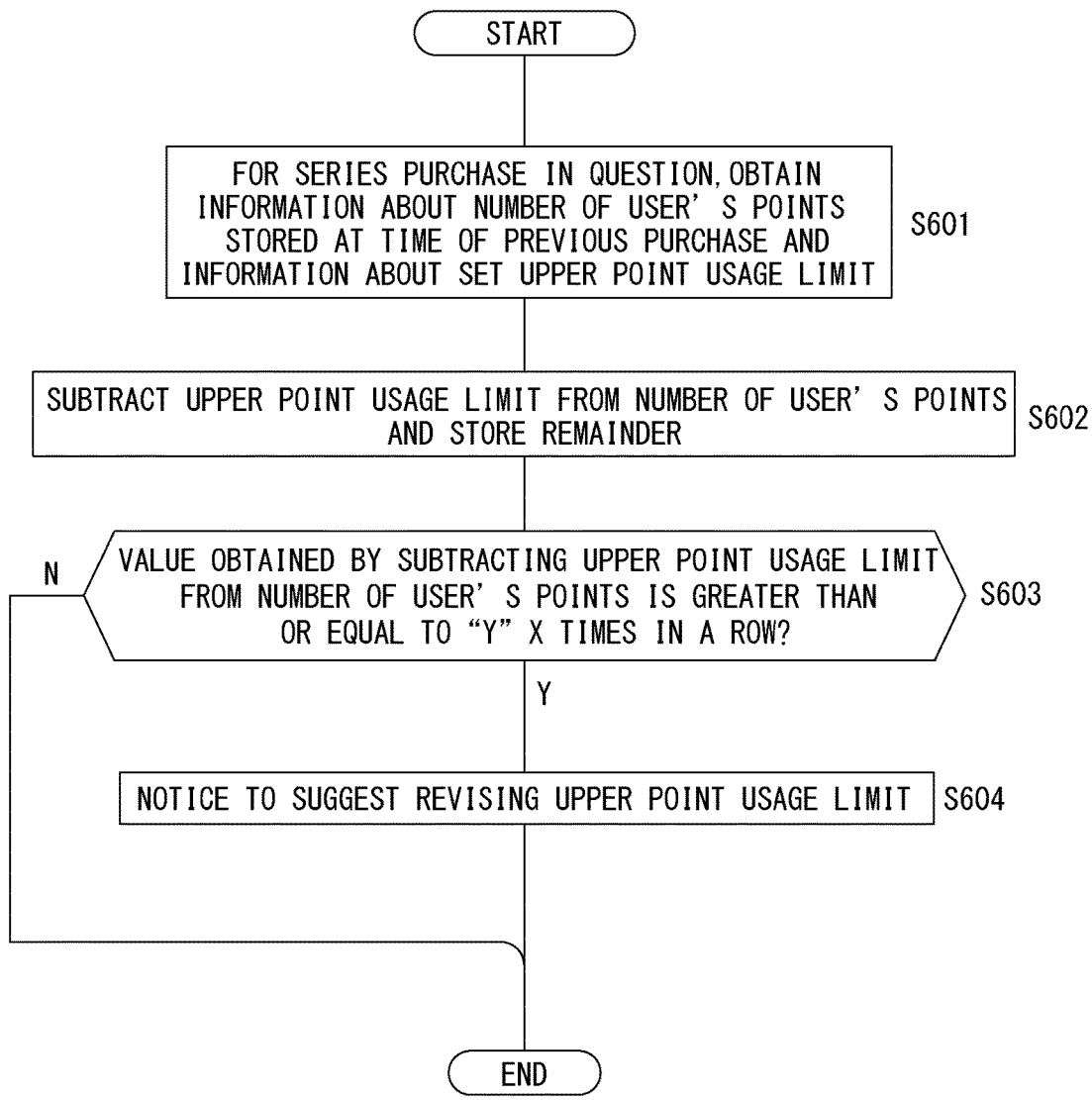
FIG. 14 is a flowchart showing a process corresponding to a revision suggestion notification processor.

FIG. 14 shows a process corresponding to the revision suggestion notification processor F4.

The process shown in FIG. 14 is performed every time each purchase in a series purchase in question is executed, for example, every time the process shown in FIG. 13 is performed.

First, in Step S601, the CPU 101 obtains, for the series purchase in question, information about the number of the user's points stored in the above Step S502 at the time of the purchase and information about the set upper point usage limit. In Step S602, the CPU 101 subtracts the "upper point usage limit" from "the number of the user's points" and stores the remainder, for example, in the storage unit 108.

In the following Step S603, the CPU 101 determines whether the value obtained by subtracting the "upper point usage limit" from "the number of the user's points" is greater than or equal to the predetermined value "Y" X times in a row.

If the value obtained by subtracting the "upper point usage limit" from "the number of the user's points" is greater than or equal to the predetermined value "Y" X times in a row, the CPU 101 proceeds to Step S604. In Step S604, the CPU 101 performs, as an upper point limit revision suggestion notification process, for example, a process for sending an e-mail including information for suggesting raising the currently set upper point usage limit to the user's registered e-mail address, and then finishes the process shown in this figure.

The notice here is not limited to an e-mail notice and may also be provided, for example, on a predetermined web page of the EC site.

On the other hand, if the value obtained by subtracting the "upper point usage limit" from "the number of the user's points" is not greater than or equal to the predetermined value "Y" X times in a row, the CPU 101 skips the notification process of Step S604 and then finishes the process shown in this figure.

Although the above describes an example where a notice to suggest raising the upper point usage limit is given, a notice to suggest lowering the limit can be given. In that case, for example, the CPU 101 may determine in Step S604 whether the value obtained by subtracting the "upper point usage limit" from "the number of the user's points" is less than or equal to −"Y" X times in a row, and may give a notice to suggest lowering the upper point usage limit if a positive result is obtained.

5. Summary of Embodiment

As described above, the information processing device (shopping server 3a) according to the embodiment includes a point count setter (the purchase order reception processor F1) and a discount payment controller (the discount payment control processor F2). For a scheduled purchase, the point count setter sets an upper point usage limit in accordance with an operation. The scheduled purchase is a purchase scheduled to be executed a period of time after a purchase order. The upper point usage limit is an upper limit of the number of points to be used. Based on the point management information, the discount payment controller controls payment for the scheduled purchase so that the payment is executed at a discount based on the upper point usage limit set by the point count setter.

The information processing device further includes a limited-time point count notifier (the limited-time point count notification processor F3) and a revision suggestion notifier (the revision suggestion notification processor F4). For the scheduled purchase for which the upper point usage limit is set, the limited-time point count notifier determines the number of limited-time points scheduled to be used or the number of limited-time points scheduled not to be used, based on the point management information and the upper point usage limit. The number of limited-time points scheduled to be used is the number of the limited-time points scheduled to be used for the scheduled purchase. The number of limited-time points scheduled not to be used is the number of the limited-time points scheduled not to be used for the scheduled purchase. Before the scheduled purchase is executed, the limited-time point count notifier notifies a user of the number of limited-time points scheduled to be used or the number of limited-time points scheduled not to be used. When, as the scheduled purchase, a scheduled purchase in a series purchase is executed, the revision suggestion notifier obtains the number of the user's points at the time of the scheduled purchase. The series purchase includes a plurality of purchases of an item or a service in one set. Based on how the difference between the obtained number of the user's points and the upper point usage limit occurs, the revision suggestion notifier gives the user a notice to suggest revising the upper point usage limit.

The user's points are used based on the upper point usage limit. Thus, the user notices in advance that the number of points to be used for the scheduled purchase is kept within the upper point usage limit. It is only when placing an order that the user has to set the number of points to be used.

The notice of the number of limited-time points scheduled to be used or the number of limited-time points scheduled not to be used prevents a relatively heavy burden of calculating the number of limited-time points scheduled to be used or scheduled not to be used from falling on the user. In addition, the revision suggestion notice prevents the burden of monitoring how the user's points are used from falling on the user and enables the user to revise the upper point usage limit to an appropriate limit depending on how the user earns and uses points.

As described above, the information processing device according to the embodiment enables a user to receive a discount on a scheduled purchase by the user's intended number of points, and reduces the burden on the user.

The notice of the number of limited-time points scheduled to be used or scheduled not to be used for the scheduled purchase reduces the user's burden of checking his or her limited-time points for expiration dates. In addition, when some limited-time points are to be used for the scheduled purchase, the user notices in advance that there is no need to rush to use the limited-time points.

In the information processing device according to the embodiment, the limited-time point count notifier determines whether there is another scheduled purchase to be executed before the scheduled purchase in question. If there is the other scheduled purchase, the limited-time point count notifier determines the number of limited-time points scheduled to be used for the scheduled purchase in question or the number of limited-time points scheduled not to be used, based on the number of limited-time points scheduled to be used for the other scheduled purchase.

In connection with the notice of the number of limited-time points scheduled to be used or scheduled not to be used, a plurality of scheduled purchases are allowed to exist overlapping with each other.

Thus, the disadvantage that the number of limited-time points scheduled to be used or scheduled not to be used cannot be notified when there is another scheduled purchase is eliminated to improve convenience.

Moreover, in the information processing device according to the embodiment, the limited-time point count notifier makes a determination whether the number of limited-time points available at purchase time, which is the number of limited-time points available for the scheduled purchase in question, is greater than or equal to the price of the item or the service subject to the scheduled purchase and the upper point usage limit set for the scheduled purchase is greater than or equal to the price of the item or the service. If a positive result is obtained, the limited-time point count notifier selects the price of the item or the service as the number of limited-time points scheduled to be used. The limited-time point count notifier makes a determination whether the upper point usage limit set for the scheduled purchase is less than the price of the item or the service and the number of limited-time points available at purchase time is greater than or equal to the upper point usage limit set for the scheduled purchase. If a positive result is obtained, the limited-time point count notifier selects the upper point usage limit set for the scheduled purchase as the number of limited-time points scheduled to be used. If negative results are obtained in both of the determinations, the limited-time point count notifier selects the number of limited-time points available at purchase time as the number of limited-time points scheduled to be used.

Thus, the number of separate cases that are required to determine the number of limited-time points scheduled to be used is minimized.

Thus, the burden of separating cases that are required to determine the number of limited-time points scheduled to be used is reduced.

Furthermore, in the information processing device according to the embodiment, every time a scheduled purchase in the series purchase is executed, the revision suggestion notifier determines whether a difference between the number of the user's points and the upper point usage limit occurs, and gives the notice based on the frequency of occurrence of the difference.

Thus, a revision suggestion is made appropriately based on the frequency of occurrence of the difference between the number of the user's points obtained with each purchase and the upper point usage limit, and the effectiveness of the revision suggestion is increased.

Also, in the information processing device according to the embodiment, the revision suggestion notifier gives the notice, based on the magnitude of the difference between the obtained number of the user's points and the upper point usage limit.

Thus, a revision suggestion is made appropriately based on the magnitude of the difference between the number of the user's points obtained with each purchase and the upper point usage limit, and the effectiveness of the revision suggestion is increased.

6. Program and Storage Medium

The shopping server 3a as an embodiment of an information processing device according to the present invention is as described above. A program according to the embodiment is a program for causing the information processing device (e.g., a CPU) to perform the processes in the shopping server 3a.

A program according to the embodiment is a program for causing an information processing device capable of accessing point management information to perform a process. The point management information separately manages, as points available for purchasing an item or a service, limited-time points having expiration dates and normal points having no expiration date or a longer expiration date than the limited-time points. The program causes the information processing device to achieve a point count setting function, a discount payment control function, a limited-time point count notification function, and a revision suggestion notification function. For a scheduled purchase, the point count setting function sets an upper point usage limit in accordance with an operation. The scheduled purchase is a purchase scheduled to be executed a period of time after a purchase order. The upper point usage limit is an upper limit of the number of points to be used. Based on the point management information, the discount payment control function controls payment for the scheduled purchase so that the payment is executed at a discount based on the upper point usage limit set by the point count setting function. For the scheduled purchase for which the upper point usage limit is set, the limited-time point count notification function determines the number of limited-time points scheduled to be used or the number of limited-time points scheduled not to be used, based on the point management information and the upper point usage limit. The number of limited-time points scheduled to be used is the number of the limited-time points scheduled to be used for the scheduled purchase. The number of limited-time points scheduled not to be used is the number of the limited-time points scheduled not to be used for the scheduled purchase. Before the scheduled purchase is executed, the limited-time point count notification function notifies a user of the number of limited-time points scheduled to be used or the number of limited-time points scheduled not to be used. When, as the scheduled purchase, a scheduled purchase in a series purchase is executed, the revision suggestion notification function obtains the number of the user's points at the time of the scheduled purchase.

The scheduled purchase includes a plurality of purchases of an item or a service in one set. Based on how the difference between the obtained number of the user's points and the upper point usage limit occurs, the revision suggestion notification function gives the user a notice to suggest revising the upper point usage limit.

That is, this program corresponds to a program for causing an information processing device, such as the shopping server 3a, to perform the processes described with reference to, for example, FIGS. 9 to 14.

This program can achieve the information processing device as the above-described shopping server 3a.

The program can be pre-stored, for example, in a HDD as a storage medium built in a computer device or in a ROM in a microcomputer including a CPU. Alternatively, the program can be temporarily or permanently stored (recorded) in a removable storage medium, such as a semiconductor memory, a memory card, an optical disk, a magneto-optical disk, or a magnetic disk. Such a removable storage medium can be provided as what is called package software.

The program can not only be installed from the removable storage medium, for example, to a personal computer, but can also be downloaded from a download site over a network, such as a LAN and the Internet.

7. Modification

The present invention is not limited to the specific examples described above, and various modifications are possible.

Although the above describes an item subscription as an example of a series purchase, examples of the series purchase include periodic purchases of public services, such as electricity, gas, water, and communication/telephone services.

REFERENCE SIGNS LIST 1 network system, 2 network, 3 shopping site operation system, 3a shopping server, 3d point DB (database), 4 user terminal, 5 shop terminal, 6 card company server, 101 CPU, F1 purchase order reception processor, F2 discount payment control processor, F3 limited-time point count notification processor, F4 revision suggestion notification processor

What is claimed is:

1. An information processing device capable of accessing point management information, the point management information separately managing, as points available for purchasing an item or a service, limited-time points having expiration dates and normal points having no expiration date or a longer expiration date than the limited-time points, the information processing device comprising:
   at least one memory configured to store computer program code; and
   at least one processor configured to access said at least one memory and operate according to said computer program code, said computer program code including:
   purchase order reception code configured to cause at least one of said at least one processor to:
      provide a user interface configured to: i) receive a setting of an upper point usage limit, and ii) receive an activation of a button;
      receive, via the user interface, a selection of a payment method, the setting of the upper point usage limit, and the activation of the button;
   point count setting code configured to cause at least one of said at least one processor to set, for a scheduled purchase, the upper point usage limit, the scheduled purchase being a purchase scheduled to be executed a period of time after a purchase order, the upper point usage limit being a predetermined upper limit of a number of points to be used, wherein the predetermined upper limit is determined before a commencement of a series purchase;

discount payment code configured to cause at least one of said at least one processor to control a payment for the scheduled purchase so that the payment is executed at a discount based on the upper point usage limit, based on the point management information;

limited-time point count notifier code configured to cause at least one of said at least one processor to:
  determine, for the scheduled purchase for which the upper point usage limit is set, a number of limited-time points scheduled to be used or a number of limited-time points scheduled not to be used based on the point management information and the upper point usage limit, and
  notify a user by a first e-mail to a registered e-mail address of a user or on a first predetermined web page of an electronic commerce website of the number of limited-time points scheduled to be used before the scheduled purchase is executed, thereby relieving the user's burden of checking the limited-time points for the expiration dates; and revision suggestion notifier code configured to cause at least one of said at least one processor to:
  obtain, when, as the scheduled purchase, the scheduled purchase in the series purchase is executed, a first number of the user's points at a time of the scheduled purchase, and
  give the user a notice by a second e-mail to the registered e-mail address of the user or on a second predetermined web page of the electronic commerce website, wherein the notice is configured to suggest revising the upper point usage limit based on a magnitude of a difference between the obtained number of the user's points and the upper point usage limit, the series purchase including a plurality of purchases of an item or a service in one set.

2. The information processing device according to claim 1, wherein
the limited-time point count notifier code is further configured to cause at least one of said at least one processor to:
determine whether there is another scheduled purchase to be executed before the scheduled purchase in question, and
if there is the another scheduled purchase, determine the number of limited-time points scheduled to be used for the scheduled purchase in question or the number of limited-time points scheduled not to be used, based on a number of limited-time points scheduled to be used for the another scheduled purchase.

3. The information processing device according to claim 1, wherein
a number of limited-time points available at purchase time is the number of limited-time points available for the scheduled purchase in question,
the limited-time point count notifier code is further configured to cause at least one of said at least one processor to:
make a first determination whether the number of limited-time points available at purchase time is greater than or equal to a price of the item or the service subject to the scheduled purchase and the upper point usage limit set for the scheduled purchase is greater than or equal to the price of the item or the service,
if a first positive result is obtained by the first determination, select the price of the item or the service as the number of limited-time points scheduled to be used,
make a second determination whether the upper point usage limit set for the scheduled purchase is less than the price of the item or the service and the number of limited-time points available at purchase time is greater than or equal to the upper point usage limit set for the scheduled purchase,
if a second positive result is obtained by the second determination, select the upper point usage limit set for the scheduled purchase as the number of limited-time points scheduled to be used, and
if negative results are obtained in both the first determination and the second determination, select the number of limited-time points available at purchase time as the number of limited-time points scheduled to be used.

4. The information processing device according to claim 1, wherein the revision suggestion notifier code is further configured to cause at least one of said at least one processor to, when a scheduled purchase in the series purchase is executed, determine whether the difference between a number of the user's points and the upper point usage limit occurs, and gives the notice based on a frequency of occurrence of the difference.

5. An information processing method for an information processing device capable of accessing point management information, the point management information separately managing, as points available for purchasing an item or a service, limited-time points having expiration dates and normal points having no expiration date, the information processing method comprising:
providing a user interface configured to: i) receive a setting of an upper point usage limit, and ii) receive an activation of a button;
receiving, via the user interface, a selection of a payment method, the setting of the upper point usage limit, and the activation of the button;
setting, after the activation of the button and for a scheduled purchase, the upper point usage limit in accordance with the receiving the setting of the upper point usage limit, the scheduled purchase being a purchase scheduled to be executed a period of time after a purchase order, the upper point usage limit being a predetermined upper limit of a number of points to be used, wherein the predetermined upper limit is determined before a commencement of a series purchase;
controlling a payment for the scheduled purchase so that the payment is executed at a discount based on the set upper point usage limit, based on the point management information;
determining, for the scheduled purchase for which the upper point usage limit is set, a number of limited-time points scheduled to be used or a number of limited-time points scheduled not to be used based on the point management information and the upper point usage limit, the number of limited-time points scheduled to be used being a number of the limited-time points scheduled to be used for the scheduled purchase, the number of limited-time points scheduled not to be used being a number of the limited-time points scheduled not to be used for the scheduled purchase;
notifying a user by a first e-mail to a registered e-mail address of a user or on a first predetermined web page of an electronic commerce website of the number of limited-time points scheduled to be used before the scheduled purchase is executed, thereby relieving the user's burden of checking the limited-time points for the expiration dates;

obtaining, when, as the scheduled purchase, a scheduled purchase in the series purchase is executed, a number of a user's points at a time of the scheduled purchase, the series purchase including a plurality of purchases of an item or a service in one set; and giving the user a notice by a second e-mail to the registered e-mail address of the user or on a second predetermined web page of the electronic commerce website, wherein the notice is configured to suggest revising the upper point usage limit based on a magnitude of a difference between the obtained number of the user's points and the upper point usage limit, the series purchase including a plurality of purchases of an item or a service in one set.

6. A non-transitory storage medium storing a program for causing an information processing device capable of accessing point management information separately managing, as points available for purchasing an item or a service, limited-time points having expiration dates and normal points having no expiration date or a longer expiration date than the limited-time points to perform a process, and for causing the information processing device to:

provide a user interface configured to: i) receive a setting of an upper point usage limit, and ii) receive an activation of a button;

receive, via the user interface, a selection of a payment method, the setting of the upper point usage limit, and the activation of the button;

set, after the activation of the button and for a scheduled purchase, the upper point usage limit in accordance with the receiving the setting of the upper point usage limit, the scheduled purchase being a purchase scheduled to be executed a period of time after a purchase order, the upper point usage limit being a predetermined upper limit of a number of points to be used, wherein the predetermined upper limit is determined before a commencement of a series purchase;

control a payment for the scheduled purchase so that the payment is executed at a discount based on the set upper point usage limit, based on the point management information;

determine, for the scheduled purchase for which the upper point usage limit is set, a number of limited-time points scheduled to be used or a number of limited-time points scheduled not to be used based on the point management information and the upper point usage limit, the number of limited-time points scheduled to be used being a number of the limited-time points scheduled to be used for the scheduled purchase, the number of limited-time points scheduled not to be used being a number of the limited-time points scheduled not to be used for the scheduled purchase;

notify a user by a first e-mail to a registered e-mail address of a user or on a first predetermined web page of an electronic commerce website of the number of limited-time points scheduled to be used before the scheduled purchase is executed before the scheduled purchase is executed, thereby relieving the user's burden of checking the limited-time points for the expiration dates;

obtain, when, as the scheduled purchase, a scheduled purchase in the series purchase is executed, a first number of a user's points at a time of the scheduled purchase, the series purchase including a plurality of purchases of an item or a service in one set; and give the user a notice by a second e-mail to the registered e-mail address of the user or on a second predetermined web page of the electronic commerce website, wherein the notice is configured to suggest revising the upper point usage limit based on a magnitude of a difference between the obtained number of the user's points and the upper point usage limit, the series purchase including a plurality of purchases of an item or a service in one set.

7. The information processing method of claim 5, further comprising:

providing a third web page illustrating an item image of an item, an item name, an item price, and a first button for placing a series purchase order of the item;

providing a fourth web page illustrating a selectable delivery cycle of the item; and receiving a first user input on the fourth web page indicating a selected delivery cycle of the item, wherein the setting of the upper point usage limit is associated with the item price of the third web page, and wherein the giving the user notice by the second e-mail or on the second predetermined web page comprises giving the notice when the difference has, in a predetermined number of consecutive occurrences, exceeded a predetermined threshold.

* * * * *